United States Patent [19]

Milgram

[11] 3,788,722

[45] Jan. 29, 1974

[54] PROCESS FOR PRODUCING A GASEOUS BREAKDOWN DISPLAY DEVICE

[75] Inventor: Alvin A. Milgram, Wilmington, Del.

[73] Assignee: Panel Technology Inc., Wilmington, Del.

[22] Filed: Apr. 18, 1973

[21] Appl. No.: 352,471

Related U.S. Application Data

[63] Continuation of Ser. No. 83,387, Oct. 23, 1970, abandoned, which is a continuation-in-part of Ser. No. 819,555, April 29, 1969, abandoned.

[52] U.S. Cl. .................. 316/19, 29/25.14, 29/25.11, 316/20, 316/24

[51] Int. Cl. .................. H01j 9/18

[58] Field of Search ... 29/25.1, 25.11, 25.13, 25.14, 29/25.17, 25.18; 316/19, 20, 24, 26

[56] References Cited

UNITED STATES PATENTS

| | | | |
|---|---|---|---|
| 2,933,648 | 4/1960 | Bentley | 315/169 |
| 3,189,978 | 6/1965 | Stetson | 29/625 |
| 3,423,517 | 1/1969 | Anrhenius | 174/68.5 |
| 3,520,054 | 7/1970 | Pensack et al. | 264/61 X |
| 3,558,975 | 1/1971 | Ogle | 316/19 |
| 3,564,680 | 2/1971 | Kerstetter | 29/25.13 |
| 3,589,789 | 6/1971 | Hubert et al. | 316/19 |

OTHER PUBLICATIONS

"Modern Dictionary of Electronics" 3rd Edition printed 1970, by H. W. Sams & Co., see pages 514–515, see thick film and thin film definitions.

*Primary Examiner*—Richard B. Lazarus
*Attorney, Agent, or Firm*—James A. Forstner

[57] ABSTRACT

A method for making a gaseous breakdown display device having a gas contained within a sealed volume between a transparent face and a dielectric body, said process comprising co-firing precious metal excitation electrodes and a dielectric body having a cavity, thereafter enclosing the gas in said cavity with a transparent face. The gaseous breakdown is contained by the device structure. The gaseous ions and intense heat generated by the discharge do not harm the components of the device made according to this invention because the device components are capable of operating at high temperatures in oxidizing atmospheres and are good conductors of heat. Consequently, the device can operate at high power density, which provides a high light output.

7 Claims, 7 Drawing Figures

INVENTOR

ALVIN A. MILGRAM

BY James A. Forstner

ATTORNEY

PROCESS FOR PRODUCING A GASEOUS BREAKDOWN DISPLAY DEVICE

CROSS-REFERENCE TO RELATED APPLICATION

This is a continuation of application Ser. No. 83,387, filed Oct. 23, 1970 and now abandoned, which in turn is a continuation-in-part of my application Ser. No. 819,555, filed Apr. 29, 1969, now abandoned.

BACKGROUND OF THE INVENTION

This invention relates to gaseous breakdown display devices, and more particularly, to a novel method for making the same.

Due to the materials of construction and methods of producing such devices, prior art devices have not been capable of providing a high light output. The intense heat generated by gaseous discharge can harm the components of the device since the heat is enclosed in a small volume. The present invention (1) overcomes these deficiencies by providing a process which utilizes materials which are capable of operating at high power levels in confined volumes and (2) which requires only a single firing step where metals which mill above the sintering temperature of the substrate are employed.

SUMMARY OF THE INVENTION

This invention relates to a method for making a gaseous breakdown display device, which device comprises an inorganic dielectric body having precious metal excitation electrodes, a gas which has a high optical output under gaseous discharge conditions and a transparent face. In the device the gas is contained within a sealed volume between the transparent face and the dielectric body, and the excitation electrodes are positioned in the dielectric body to excite the gas when an electrical potential is applied to the electrodes. The invention method comprises the steps of a. preparing an unsintered sheet having a cavity for the gas, said sheet comprising finely divided ceramic particles and a temporary binder therefor,
b. applying a paste to said sheet in at least part of the desired electrode configuration, said paste comprising precious metal particles and a temporary binder therefor, said precious metal particles having a melting point above the temperature at which the sheet sinters,
c. sintering the substrate with applied paste for a time and at a temperature sufficient to violatilize the temporary binders and to sinter said ceramic particles and said metal particles into a monolithic structure, wherein the metal particles form electrical conductors,
d. filling the cavity with said gas and
e. enclosing the cavity with the transparent face.

DESCRIPTION OF THE PREFERRED EMBODIMENTS

Figure 1:
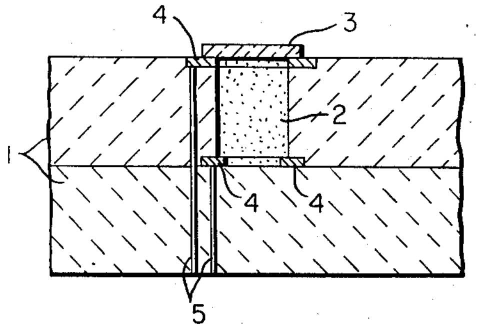
FIG. 1 is a side view of a "dot-type" gaseous breakdown display device, said view being taken in the plane perpendicular to the line 1—1 in FIG. 2.

As indicated in the Summary of the Invention, the method of the present invention may involve making gaseous breakdown display devices from a single dielectric substrate having a cavity therein. In that embodiment, one or more electrodes may be printed on the face of the substrate so that each runs along the face of the substrate and then into the cavity and, optionally, down the side wall of the cavity. The electrode must extend out from under the transparent face so that it may be attached to an electrical field. Alternately, one or more holes may be punched in the unfired substrate such that, when filled with metallization, electrodes pass through the substrate and then lead into the cavity from the side or bottom of the cavity.

Another preferred embodiment of the method of the present invention employs making a gaseous breakdown display device in which said device is part of a multilayer circuit board comprising a monolithic ceramic body, electrical conductors disposed in one or more layers within said body and bonded thereto, and electrical interconnecting means entirely within said body linking said conductors in different layers, said conductors and electrical interconnecting means being composed of gas-free precious metal particles sintered to said ceramic and to each other, comprising the steps of a. preparing a plurality of said sheets, one of said sheets having a cavity for said gas,
b. forming holes for said interconnecting means at desired locations in at least one of said sheets,
c. filling said holes with paste comprising gas-free precious metal particles and a temporary binder therefor,
d. printing the paste on selected areas of at least one of said sheets in the desired printed conductor configuration,
e. assembling said sheets in a stack such that the printed conductors and filled conductor holes are in a desired relationship and such that the cavity for said gas is in the top of the uppermost layer of the stack,
f. bonding the stacked sheets into a laminate,
g. sintering as above,
h. filling the cavity with said gas and
i. sealing the cavity with the transparent face.

In any embodiment of the present invention employing buried metallizations in monolithic structures, the metallization paste must obviously be applied prior to sintering. Hence, the metal selected must melt at a temperature above the sintering temperature of the dielectric substrate sheet. However, where either (1) surface metallizations are employed, or (2) electrical conductor interconnecting means which are accessible from the outside of the fired monolithic structure are employed, the metallization need not have a melting point above the sintering temperature of the dielectric sheet. In the latter case, metallization pastes can be printed on the surface of, or used to fill holes in, the dielectric substrate, after firing to sinter the same; thereafter a second firing step is used to form electrically conducting printed patterns or interconnecting means on the prefired substrate. In any given embodiment of this process, a combination of metallizations may be employed, if so desired, as in the Example herein.

A more complete understanding of the devices produced by the present invention can be made from a study of the drawings. FIG. 1 shows a side view of a gaseous breakdown display device (taken perpendicular to the line 1—1 in FIG. 2) comprising a monolithic ceramic substrate 1 made from two layers of alumina; an opening having a volume of gas 2 enclosed therein; a glass cover 3 which seals the gas in the opening in the alumina body; and excitation electrodes 4 in the shape of annular discs, the bottom electrode being buried between the alumina layers. When an electric potential is applied to the conductors 5, the electrodes excite the gas and produce a visible glowing discharge. It is pointed out that conductors 5 which are buried in the dielectric body, lead to the excitation electrodes and to the surface; these conductors can be referred to as "vias."

Figure 2:
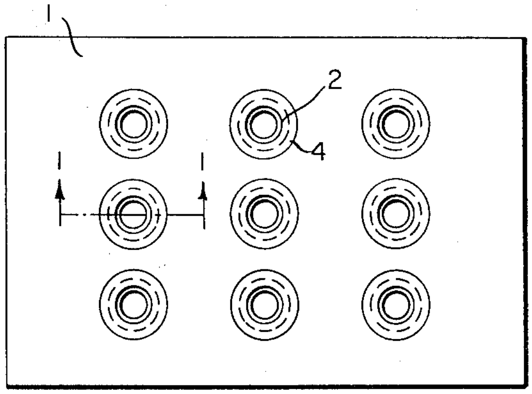
FIG. 2 is a top view of several "dot-type" gaseous display devices on a single dielectric substrate.

In FIG. 2, there is shown a top view of nine enclosures each having an electrode structure as shown in FIG. 1; glass cover 3 is not shown. By using a plurality of these enclosures and the proper electrical excitation, any numerical and/or alphabetical symbols can be produced by the gaseous discharge glow which emanates from any of the enclosures. Thus, this device could be used to display numerical information or alphabetical characters. Furthermore, in lieu of an individual glass cover over each cavity, the entire surface area over the nine cavities can be covered with a glass plate using conventional dielectric sealing techniques.

Figure 3:
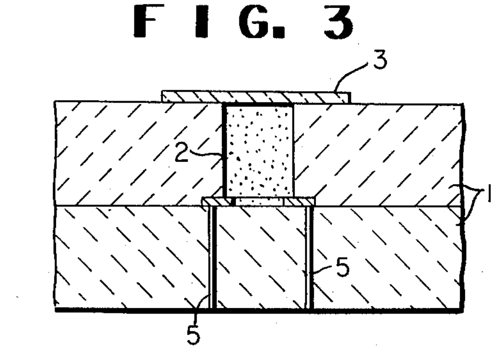
FIG. 3 is a side view of a line bar gaseous display device, taken in the plane perpendicular to the line 3—3 in FIG. 4.
Figure 4:
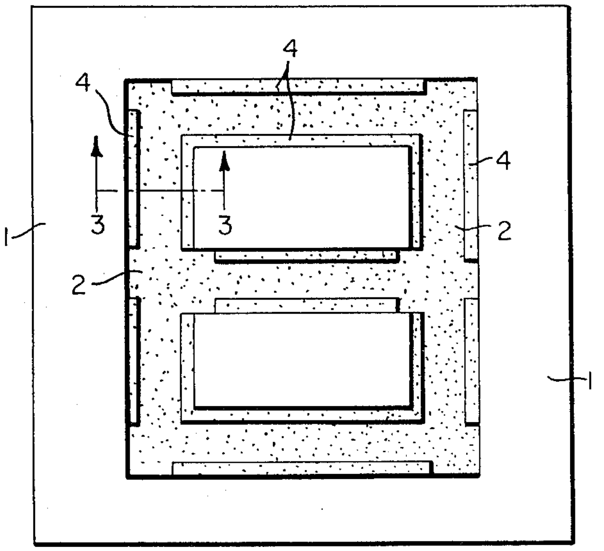
FIG. 4 is a top view of a line bar gaseous display device.

FIG. 3 is a side view of a part of a line bar display device (taken in a plane perpendicular to the line 3—3 in FIG. 4) showing glass cover 3. FIG. 4 is a top view of the complete line bar display device, but not showing glass cover 3. Electrodes 4 in the shape of rectangular bars are positioned in alumina body 1; gas 2 is contained in a channel within the alumina body. A glass cover may be positioned over the entire alumina body 1, or just over the line bar configuration.

The important materials used in the method of this invention are the inorganic dielectric material and the precious metal excitation electrodes produced from metallizations applied to and fired on the dielectric body. A wide variety of dielectric materials may be used. For example, ceramic materials consisting chiefly of alumina, steatite, zircon, aluminum silicate, zirconium dioxide, titanium dioxide, beryllium oxide, magnesium silicate, etc., and various combinations thereof, are illustrative of dielectric materials which may be employed.

The fired-on precious metal excitation electrodes are critical and vital. If a multilayer dielectric body is utilized, the metallization used for any buried conductors must be able to be fired on and sintered compatibly with the dielectric material. The thermal expansion of the dielectric material and of the metallizations should match as closely as possible to minimize internal strains. Also, in multilayer structures the metallization should be substantially free of all dissolved, absorbed, adsorbed, or otherwise occluded gases (i.e., gas-free) to minimize bubbling, blistering and delamination during the firing of the metallized dielectric sheets. Any of the conventional precious metals may be used; these include platinum, palladium, silver, gold, alloys thereof and mixtures thereof. All of the metal particles should be in finely divided or powder form, that is, in the form of powders sufficiently finely divided to pass through a 325-mesh (U.S. standard sieve scale) screen. Suitable metallizations are disclosed in U.S. Pat. No. 3,511,640 and Ser. No. 756,394, filed Aug. 30, 1968 and assigned to the assignee of this application. Molybdenum and manganese may also be used to form the electrodes, but only when non-oxidizing atmospheres can be tolerated. However, the preferred metallizations are of precious metals due to the convenience of air firing.

The gaseous breakdown display devices of this invention are preferably made by applying precious metal compositions to an unfired dielectric body at the desired location(s); any lead-in wiring can also be supplied. The unfired body has a cavity into which the gas will be sealed. By an unfired dielectric body is meant a sheet comprising finely divided ceramic particles and a temporary binder therefor.

According to the method of this invention, the gaseous breakdown display devices may be made from either one sheet or layer of unfired (unsintered) dielectric material, or from many layers thereof. In either embodiment the unfired dielectric is provided with a cavity, which after firing and enclosure with a transparent face serves as the sealed volume for the gas.

The first step of the process involves preparing sheets each comprising finely divided ceramic particles and a temporary binder. These sheets are commonly referred to as "ceramic substrates," "green sheets," or "tape" and are well known in the art. The temporary binder utilized should be of the type which can be completely removed by depolymerization, evaporation or oxidation. However, when a multilayer structure is employed, the removal should not be so rapid as to bloat or explode the laminate during the firing step. The binder in the film should be compatible with the binder in the metallization and both should be of the type which aid bonding during the laminating step if any. Also, the binder should serve to retain the ceramic particulate in undisrupted position and facilitate the formation of dry, flexible sheets of the particulate ceramic material free of pinholes, cracks and other imperfections. Some suitable binders include polyvinyl chloride polymers, polystyrene polymers, polymethyl methacrylate resins, ethyl cellulose, cellulose acetate polymers, polyester polymers, and cellulose acetate-butyrate polymers. These binders, preferably together with a suitable solvent, may also be used in the metallizing compositions.

The sheets may be produced by extrusion, in which case a solvent is not required. Where some other sheet-forming process is used (e.g., doctor blading), a solvent which is compatible with the binder is required. Some solvents which may be used include ethyl alcohol, isopropyl alcohol, acetone, methyl ethyl ketone, beta-terpineol and toluene. In addition, a plasticizer, a wetting agent and a deflocculant for assisting in enhancing sheet-forming characteristics, for dispersing the ceramic composition and for adjusting the viscosity of the sheet formulation are optional. Where they are used, they may be utilized in the combinations and in the quantities which are well known in the art.

The weight ratio of ceramic dielectric composition to binder in the sheet formulation may vary between 95:5 to 60:40. Where multilayer structures are employed, the lowest proportion of binder should be used consistent with adequate bonding during the lamination step. Usually, formulations with finer particle sizes require a higher proportion of the binder. The sheet formulation may be mixed by any of the conventional methods, such as ball milling, roll milling, or by high speed agitation in an agitator or a homogenizer. In general, any method which produces a uniform dispersion is adequate.

The sheet may be formed by any of the conventional methods such as by spraying the sheet formulation on a support, or screening on a support, or offset printing on a support, or by floating a low viscosity sheet formulation on an incompatible liquid, or by doctor blading. Where the sheet formulation is very viscous, the sheet may be produced by extrusion through a die onto a support. Doctor blading is the preferred method and requires a minimum amount of equipment while still providing accurate control over the sheet size and thickness which may vary to meet any specific requirements. Important process variables for doctor blading are the casting rate, rheology of the suspension, carrier and release from this carrier. Typical carrier materials are glass, steel, Mylar, Teflon, flexible belts, etc. In general, any non-reactive, flexible or rigid supporting material may be used. During sheet formation, the cavity in which the excitation gas will be sealed, may be formed.

After the sheet is formed, it is dried, e.g., by evaporation of the solvent in air; this may be accelerated by applying heat and/or air circulation. Ovens, infrared heaters, air blowers, etc., may be used. After the drying operation, the sheet is stripped from its support. At this point, the sheet is flexible and may be easily cut into any desired shape or have portions punched therefrom. The sheets may be cut, punched or stamped to any convenient size with sufficient area to print a plurality of circuit portions thereon.

The next step may (and in the case of multilayer structures does) involve punching holes to a very close tolerances at desired locations in the sheets which have the desired configuration. Holes are punched in the sheets to produce a desired pattern for interconnection of the ultimate multi-layer system. Different size and shape holes can be made to provide subsequent electrical connections throughout a stack of sheets. Following the hole punching operation, the sheets are ready to be coated with a metallizing composition to fill the holes and/or to form printed conductors, as desired.

The step of filling the holes with a metallization paste is optional at this point in the process. If the holes are filled, the metal employed must melt at a temperature above the sintering temperature of the dielectric sheet. Generally, it is desirable to fill the holes at this point in the process since the holes are more readily accessible and the results obtained therefrom are more beneficial than when the holes are filled at any other stage of the process of this invention. In the alternative, the holes may be filled after the conductor patterns have been printed or even, in the case of laminated structures, the holes may be filled after the laminating step. If the holes are filled after the conductor patterns have been printed, there is a tendency to disrupt the conductor patterns by the rubbing action of squeegee blade and the screen contact if this printing technique is used. In any event, the exact sequence in steps as to filling the holes is not critical but it is desirable to fill the holes before any other printing operations are performed.

The metallization which forms the excitation electrodes (and buried conductors if any) may be applied to the substrate by any of the known printing or stenciling techniques. Thus, a stencil may be pressed against a surface of the di-electric body and the metallizing composition sprayed or brushed into the uncovered portions of the dielectric body. On the other hand, the metallizing pattern may be produced by offset printing upon the body. Preferably, the pattern is produced by screen stenciling techniques. The spacing between electrodes is determined by the thickness of the dielectric layers.

Following application, the metallization is dried. If a multilayer structure is involved, after producing a metallized pattern on one or more ceramic sheets, the sheets are stacked in the proper registry with respect to one another and bonded into a monolithic laminate. The ceramic composition in the various sheets may be the same or may differ from layer to layer. Thus, in the laminate produced, different ceramic compositions may be used to obtain desired combinations of physical, chemical or electrical properties. Also, the metallizing composition may be the same or may differ in composition or in configuration from sheet to sheet. The stack of sheets is bonded together into a laminate by any of the conventional techniques. The action of heat, pressure or solvent vapors, or any combination of these techniques may be used. While the action of pressure alone has been found to be adequate, solvent vapors can be used to soften the stack of films. For example, the stack may be placed in a desiccator and subjected to solvent vapors. The solvent can be any solvent which will soften the ceramic sheet. By subjecting the stack of sheets to this solvent vapor action, the sheets become softened and are more readily laminated when the final pressure is applied. Also, the well known heat and pressure technique are adaptable.

The next step involves sintering in the usual manner for ceramic articles by heating for the desired time and at the desired temperatures. The choice of sintering time and sintering temperature depends on the particular ceramic composition and the particular article being sintered. It is important to appreciate that this step is carried out to remove the binders, complete any chemical reactions, densify the structure, complete the bonds between phases, control the grain and pore sizes, and establish the residual stresses. To achieve this end, the metallized substrate is first heated at a lower temperature, preferably between 200°C. and 600°C. in air until the binders are volatized. Then the temperature is raised to a higher range, preferably between 1000°C. and 1750°C., until the particles are sintered. This sintered article is cooled and removed from the furnace. The sintered article may be cut into units if device blanks have not previously been cut. Thereby there is produced a monolithic dielectric structure comprising the excitation electrodes and any desired lead-in wiring.

Any desirable gas, such as neon, argon, air, helium, krypton, xenon, or a mixture thereof is then placed at the desired pressure in the designated channel or cavity within the dielectric body. The cavity can be of any desirable configuration depending on the characteristic gaseous discharge to be produced.

A transparent face is then placed over the cavity to seal the gas within the dielectric body. Any suitable transparent material such as glass, polished alumina, etc., may be utilized provided, it can be made to adhere to the dielectric using suitable interfacing adhesives such as epoxies and glass frits. It is, of course, necessary that the covering which seals in the gas be transparent so that the glowing gas can be seen.

The novel concept of this invention lies in the use of fired-on precious metal excitation electrodes and a dielectric body; both may be fired simultaneously in an oxidizing atmosphere during the manufacture. In any event there is produced a hermetically sealed device capable of operating at high electric current densities, and consequently higher light output. The heat generated by this device can be efficiently dissipated because of the high thermal conductivity of the device materials. The device structure is compact (miniaturized) and can be "plugged" in as a complete unit. The drive circuitry for performing the logic functions of operating the display can be an integral part of the device structure. That is, the resistors, conductors and capacitors could be screen-printed and air fired on the dielectric structure and active elements attached to the dielectric structures.

Other modifications of this invention include gaseous display devices wherein the drive circuitry is entirely incorporated as part of the dielectric and circuitry on the outside of the dielectric body is hermetically sealed with a can or other appropriate cover; lead pins are positioned for external connection. Also, multilayer circuit boards comprising a monolithic ceramic body and interconnecting means, such as described in Ser. No. 806,256, filed Mar. 11, 1969 and assigned to the assignee of this application, may be part of the display device and/or contain the display device.

In another embodiment, a multicolor flat-screen television display can be produced according to this process. Various layers of a multilayer dielectric body are doped with phosphors that emit green, blue or red when bombarded by electrons and photons. By means of the appropriate excitation electrodes, a local gas discharge occurs in the channel or cavity between two excitation electrodes. The gaseous discharge causes the appropriate color to be excited. An observer viewing the discharge through the television face-plate (screen) sees a color which is the sum of the colors which are discharged in the channel (space). A matrix of such channels form a display whereby pictures or alphanumeric characters are produced. Thus, a flat, thin display device can be produced for applications where portability or limited space are important.

A preferred method of making the device in accordance with this invention is described in the Example, wherein all percentages and parts are by weight.

EXAMPLE

A dielectric sheet was first prepared with the ingredients listed below in the following proportions by weight:

190 grams powdered alumina
10 grams powdered talc
7.7 grams heat volatile binders (polymethyl methacrylate)
11.6 grams plasticizer (polyvinylacetate)
3.2 cc. wetting agent (butylcellosolve)
11.6 cc. release agent (Carbowax 200)
150 cc. solvent (trichloroethylene)

Figure 5A:
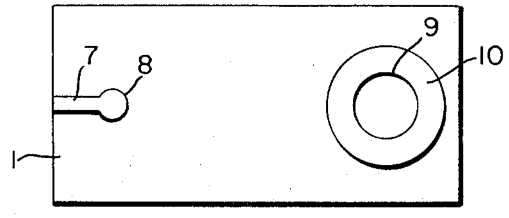
FIGS. 5 are views of the example.
Figure 5B:
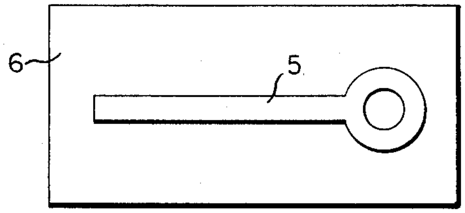

The above ingredients were introduced into ball mill and milled for a period of four hours. When milling was completed, the milled material was emptied into a container which was then placed in a vacuum chamber to remove air bubbles. A sheet was then prepared by pouring a sufficient quantity of the ceramic slurry onto a glass plate. A steel doctor blade was passed across the surface of the plate to provide a sheet having the desired thickness; in this case the sheet had a thickness of about 20 mils. The sheet was dried in ambient air for a period of two hours. The resultant dried sheet was flexible and able to be stripped from the glass substrate. Two rectangular portions (1 inch by 1 inch) were punched from the dried sheet. The rectangular sheets are hereinafter referred to as sheets 1 and 6, respectively. Two cylindrical holes 8 and 9 were then punched through sheet 1, about 10 mm. apart. Hole 8, to be filled with conductor metallization, was about ½–¾ mm. in diameter; hole 9, the gas cavity was about ½–¾ mm. in diameter. A platinum composition was then printed on the top of sheet 6 as conductor line 5 running from the point of sheet 6 where conductor via 8 will contact sheet 6 upon lamination of sheets 1 and 6, across the surface of sheet 6 and terminating in an open ring of metallization centered just under the spot techniques hole (gas cavity) 9 will contact sheet 6 upon lamination of sheets 1 and 6, each after the various metallization and firing steps have been completed. The disposition of metallization 5 and holes 8 and 9 on sheets 1 and 6 are shown in FIGS. 5A and 5B, respectively, which are overhead views of sheets 1 and 6, respectively.

The platinum metallization used was a paste comprising four parts of gas-free platinum powder and one part temporary binder (8 percent ethyl cellulose and 92 percent beta-terpineol) as disclosed in Example 1 of U.S. Pat. No. 3,511,640.

Ceramic sheet 1 was then stacked on metallized sheet 6 as indicated. Then the stack was subjected to a compaction force of approximately 10,000 pounds per square inch for 15 seconds. The pressure was removed and the laminate was ready for firing to produce a sintered structure. This was accomplished by placing the laminate in an ambient oven and heated slowly to a temperature of 600°C. over a period of 4 hours, until the organic vehicle system had been removed from the laminate. Then the temperature was raised rapidly to 1650°C. and held there for about 1 hour. During this time, the constituents of the ceramic dielectric composition and the particles of metal sintered into a multilayer monolithic ceramic body. The dimensional ratio of the green, unfired laminate to fired sintered structure was 1:2.

Hole 8 was then filled with a silver composition; the silver composition was printed on the top of sheet 1 as conductors 7 and 10. The silver metallization composition comprised about 62 percent silver with an average particle size of about 1 micron; about 2 percent of cadmium sodium boroaluminosilicate glass frit with an average particle size of about 5 microns; about 9 percent free bismuth oxide; and about 26 percent inert liquid vehicle.

Figure 5C:
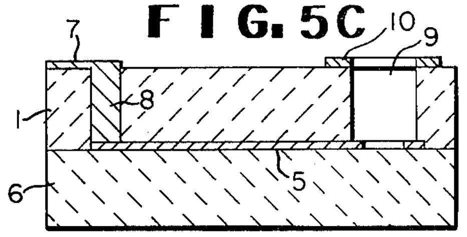

The fired substrate and silver metallizations were then refired at 760°C. for about 10 minutes to form conductive silver electrodes. FIG. 5C is a cross-sectional view of the resultant fired metallized stack, taken in the plane perpendicular to the center line of conductor 5 in FIG. 5B.

The gas cavity was then filled with air at a pressure of about 12–20 cm. of mercury at 25°C., and hermetically sealed with a glass plate using an epoxy adhesive. Conductors 7 and 10 were then connected to a 0 to 1000 volt d.c. power supply through a 30 Kohm. resistor. Voltage was applied and gradually increased until a glow discharge occurred at about 460–500 volts d.c. The discharge continued at that voltage for 1000 hours without discernible degradation of the electrodes or diminution in discharge intensity.

Since it is obvious that many changes and modifications can be made in the above-described details without departing from the nature and spirit of the invention, it is to be understood that the invention is not to be limited to said details except as set forth in the appended claims.

What is claimed is:

1. A method for making a gaseous breakdown display device, which device comprises a monolithic inorganic dielectric body having precious metal excitation electrodes, a gas which has a high optical output under gaseous discharge conditions, and a transparent face; wherein the gas is contained within a sealed volume between the transparent face and the dielectric body; and wherein the electrodes are positioned in the dielectric body to excite the gas when an electrical potential is applied to said electrodes; said process comprising the steps of a. preparing a sheet comprising finely divided ceramic particles and a temporary binder therefor, said sheet having a cavity for the gas, b. screen-printing a paste onto said sheet in at least part of the electrode configuration desired, said paste comprising precious metal particles and a temporary binder therefor, c. sintering the substrate with paste applied for a time and at a temperature sufficient to volatilize the tempoerary binders and to sinter said ceramic particles and said metal particles into a monolithic structure wherein the metal particles form electrical conductors, d. filling the cavity with said gas, and e. enclosing the cavity with the transparent face.

2. A method for making a gaseous breakdown display device according to claim 1 in which said device is part of a multilayer circuit board comprising a monolithic ceramic body, electrical conductors disposed in one or more layers within said body and bonded thereto, and interconnecting means entirely within said body linking said conductors in different layers, said conductors and interconnecting means being composed of gas-free precious metal particles sintered to said ceramic and to each other, said method comprising the steps of a. preparing a plurality of said sheets, one of said sheets having a cavity for said gas, b. forming holes for said interconnecting means at desired locations in at least one of said sheets, c. filling said holes with paste comprising gas-free precious metal particles and a temporary binder therefor, d. printing the paste on selected areas of at least one of said sheets in the desired printed conductor configuration, e. assembling said sheets in a stack such that printed conductors and filled holes are in a desired relationship and such that the cavity for said gas is in the top of the uppermost layer, f. bonding said stacked sheets into a laminate, g. sintering as in step (c) of claim 1, h. filling the cavity with said gas, and i. sealing the cavity with the transparent face.

3. A method in accordance with claim 1 wherein the inorganic dielectric body consists essentially of alumina.

4. A method in accordance with claim 3 wherein the precious metal in the paste consists essentially of platinum and the paste is printed on said sheet prior to the sintering thereof.

5. A method in accordance with claim 3 wherein the precious metal in the paste consists essentially of silver and is applied to said sheet after the sintering thereof.

6. A method in accordance with claim 1 wherein the gas is selected from the group consisting of neon, argon, air, helium, kypton, xenon and mixtures thereof.

7. A method in accordance with claim 1 wherein there is made a gaseous breakdown display device which contains a plurality of excitation electrodes and sealed volumes of gas.

* * * * *

PO-1050
(5/69)

UNITED STATES PATENT OFFICE
CERTIFICATE OF CORRECTION

Patent No. 3,788,722 Dated January 29, 1974

Inventor(s) Alvin A. Milgram

It is certified that error appears in the above-identified patent and that said Letters Patent are hereby corrected as shown below:

Column 1, Line 38, "invention" should be --inventive--

Column 2, Line 14, "field" should be --circuit--

Column 6, Line 2 "di-electric" should be --dielectric--

Column 8, Line 21 "techniques" should be -- whree --.

Column 9, Line 34 "tempeoray" should be --temporary--

Signed and sealed this 17th day of September 1974.

(SEAL)
Attest:

McCOY M. GIBSON JR.
Attesting Officer

C. MARSHALL DANN
Commissioner of Patents